United States Patent [19]

Alexander

[11] Patent Number: 4,928,340
[45] Date of Patent: May 29, 1990

[54] DOCK LEVELER

[75] Inventor: James C. Alexander, London, Canada

[73] Assignee: Serco Corporation, London, Canada

[21] Appl. No.: 315,060

[22] Filed: Feb. 24, 1989

[51] Int. Cl.⁵ ............................................... E01D 1/00
[52] U.S. Cl. ..................................... 14/71.3; 14/71.7
[58] Field of Search .................. 14/69.5, 71.1, 71.3, 14/71.7; 52/731, 732

[56] References Cited

U.S. PATENT DOCUMENTS

| | | | |
|---|---|---|---|
| 2,714,735 | 8/1955 | Watson | 14/71.7 |
| 2,941,635 | 6/1960 | Harris | 52/731 |
| 3,138,812 | 6/1984 | Prosser | 14/71.3 |
| 3,204,270 | 9/1965 | Fenton | 14/71.7 |
| 3,334,368 | 8/1967 | McIntosh et al. | 14/71.3 |
| 3,694,990 | 10/1972 | Pamer | 52/731 |
| 4,068,338 | 1/1978 | Artzberger | 14/71.3 |
| 4,455,703 | 6/1984 | Fromme et al. | 14/71.3 |

Primary Examiner—Bruce M. Kisliuk
Attorney, Agent, or Firm—Sughrue, Mion, Zinn, Macpeak & Seas

[57] ABSTRACT

A dock leveler having a rigid flat deck and a rigid hinge pin coupling the leveler to a loading dock or leveler frame element. The deck is supported by a series of spaced box beams, each one split longitudinally to provide the necessary torsional flexibility to allow a rigid hinge pin. The use of a box beam geometry still serves to provide the required load support for the deck.

9 Claims, 2 Drawing Sheets

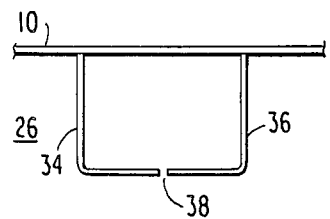
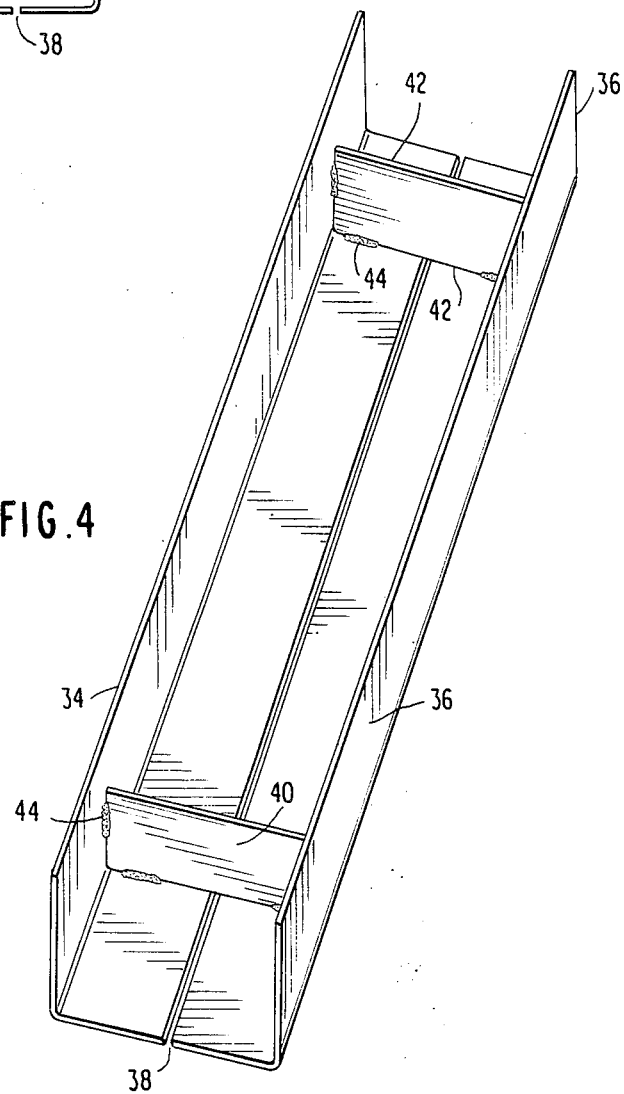

DOCK LEVELER

BACKGROUND OF THE INVENTION

This invention relates to a dock leveler construction and in particular to an improved support system for the deck of a dock leveler.

Dock levelers are commonly used in a loading dock environment to provide a bridge between the loading dock and the bed of a truck. These devices are either pit or box mounted and may store either horizontally or vertically. Actuation of dock levelers may be by the use of hydraulics, or mechanical spring systems.

Given the difference in level between the dock leveler deck and the bed of a truck, some technique must be used to provide for angular motion to compensate for that difference in level. Present systems use either a flexible deck with fixed rear hinges or a rigid deck with floating rear hinges. In the case of a flexible deck, beams are used which have a low torsional rigidity. Examples are the C-channel, I-beam, angle or in some cases special beam structures such as T or lambda beams. In the case of rigid deck construction, the deck plate is generally strengthened by welding to it a box beam to provide a strong composite beam structure. In practice, the box beam is formed of channel which forms a box when the two free legs are welded to the deck plate.

A box beam construction offers numerous advantages. For example, the box beam compared to a C-channel or I-beam has a higher proportion of material at the maximum distance below the plate. This provides a stronger, stiffer composite beam structure for a given weight of steel. Each box beam provides two support ribs for the deck as compared to a single support area in the case of a C-channel, I-beam, angle beam, T-beam or a lambda beam. This provides the deck plate with improved strength and stiffness to withstand highly concentrated loads such as those exerted by fork truck tires. Additionally, a box beam is easier to assemble because it is inherently stable when set in place during assembly. C-channel is marginally stable, but others such as angle, T or lambda beam are unstable and must be held in place during construction.

A significant limitation of box beam construction is that it forms a hollow structure with very high torsional strength and stiffness. Thus, when used in conjunction with dock levelers to provide strength the box beam requires a more expensive floating rear hinge to provide compensation for the out of level condition.

SUMMARY OF THE INVENTION

Given these deficiencies in prior art of dock levelers, it is an object of this invention to provide a dock leveler system that uses fixed hinges yet provides torsional flexibility With sufficient deck rigidity.

Yet another object of this invention is to provide for an improved dock leveler construction which may be used with either horizontally or vertically storing dock levelers that provides all of the advantages of box beam construction yet has sufficient torsional flexibility to allow for the use of a fixed rear hinge.

These and other advantages of this invention are accomplished by the use of a dock leveler deck assembly which employs a split box beam. A conventional box beam is split longitudinally so that it is a hollowed section with a longitudinal split. Thus, it loses its inherent torsional properties which are found in a closed hollow section. The split beam box is formed by two angle sections which are fastened together by welding two or more web plates between the angles. The weld zone is maintained away from the split area and the flexibility of the thin webs prevent the two beams from having any structural support from each other. However, the result in assembly retains all of the other advantages of the rigid box beam construction, but has high torsional flexibility. Consequently, when employed in a dock leveler, a fixed rear hinge can be used which is less expensive, however, the split beam allows the strength in the deck to be maintained.

This invention will be described in greater detail by referring to the attached drawings and the description of the preferred embodiment that follows.

BRIEF DESCRIPTION OF THE DRAWINGS

FIG. 3 is a cross sectional view of one split beam which is used in accordance with this invention; and FIG. 4 is a perspective view of a completed split beam in accordance with this invention.

DESCRIPTION OF THE PREFERRED EMBODIMENT

Figure 1:
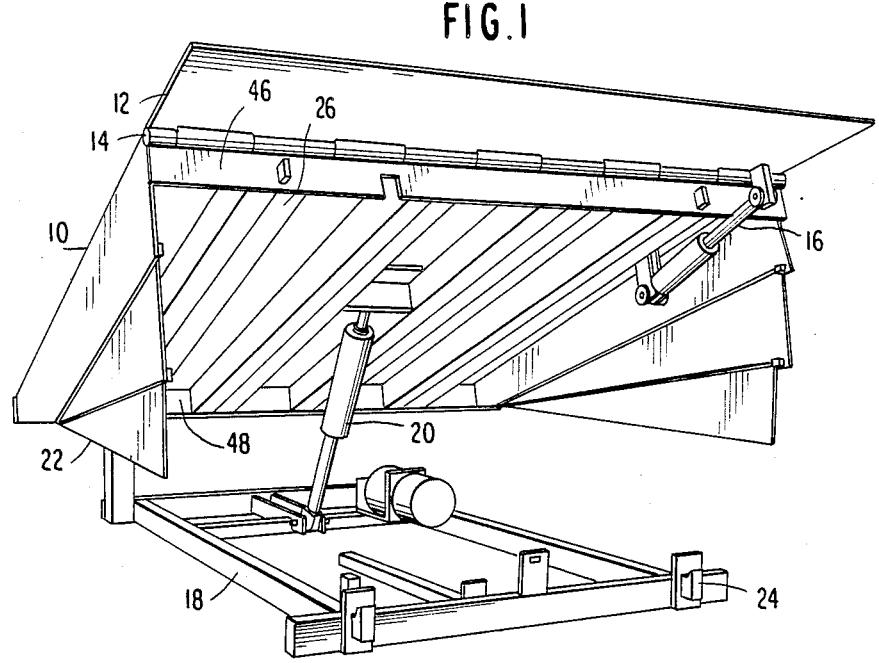
FIG. 1 is a perspective view of a dock leveler utilizing the be construction of this invention.

Referring now to FIG. 1, the basic elements of a dock leveler utilizing the split beam construction of this invention is depicted. It will be appreciated that while the dock leveler is a hydraulic pit style leveler, this invention may be used with any mechanically actuated dock leveler whether it be pit or deck or box mounted or stored horizontally or vertically. That is, this invention is not limited to any particular type of dock leveler structure.

For purposes of illustration, the leveler of FIG. 1 comprises a deck 10 having hingedly mounted thereto an extendable lip 12. The lip 12 is mounted to the deck 10 by means of a hinge 14 and is actuated by means of an hydraulic cylinder 16. It will be appreciated that other modes of actuation are within the scope of this invention. Lip actuation utilizing the hydraulic cylinder 16 is accomplished utilizing a control panel, not illustrated. The leveler is mounted as a self-supporting unit in a pit, that is, a recess in the dock by means of a frame structure 18. In the case of a pit-type mount, the deck 10 is pivotally mounted to the dock face by means of a fixed rear hinge, not illustrated. If the leveler were a box style unit, the leveler would then by pivotally mounted to its own box-type housing. As illustrated in FIG. 1, the leveler is raised up and down by means of an hydraulic cylinder 20, also actuated by a control panel, not illustrated. The leveler further comprises a fan-like toe guards 22 and night latch keepers 24 which serve to lock the lip 12 in a pendant position.

As illustrated in FIG. 1, the deck 10 is supported by means of four box beams 26. As will be explained herein, each of those beams is split longitudinally to provide sufficient torsional flexibility yet at the same time ensure that the deck has the necessary rigidity to support the highly concentrated loads which are exerted by forklift trucks as they pass from the dock to the truck bed and vice versa.

Figure 2:
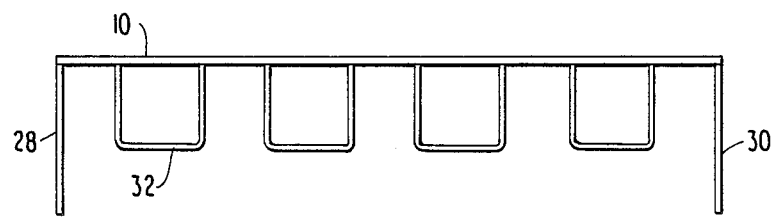
FIG. 2 is a cross section of a prior art box beam deck assembly.

Referring now to FIG. 2, a cross section of a typical box beam deck assembly is illustrated. In FIG. 2, the deck 10 has a pair of side panels 28, 30 welded to it. The box beams are typically a U-section 32 welded longitudinally to the underside of the deck 10. The lateral spacing of the beams is a function of the overall width of the deck 10 and the load to be supported.

Referring now to FIG. 3, the split beam construction of this invention is depicted. The deck 10 has welded to it two angle sections 34, 36. An open area 38 is formed to eliminate any torsional rigidity which would be inherent in a closed box beam structure. As can be appreciated by utilizing a box beam geometry but not a closed box beam, a large amount of material is placed at the greatest distance from the deck, and two areas of deck support are provided by each beam thereby achieving the necessary structural support for the deck.

Referring now to FIG. 4, the construction of a typical box beam is illustrated. The two angle sections 34 and 36 are held together by welding two or more web plates 40, 42. The webs 40 and 42 are welded to each of the sections 34 and 36. As illustrated in FIG. 4, the weld zones 44 are kept away from the split area 38. Moreover, because the webs are relatively thin, they prevent the two angle sections 34 and 38 from having any structural support from each other. The purpose of the webs is to join the two units 34 and 36 together into a subcomponent which may then be welded to the underside of the deck 10. While two webs are illustrated, it can be appreciated that three or more webs may be used.

Referring now to FIG. 1, each of the beams 26 when formed as a sub-assembly is then welded to the underside of the deck 10. Additionally, the front edges of the angle sections can be welded to a front plate 46 and to a rear plate 48 to provide further support. In such a construction, all of the advantageous properties of a box beam construction are maintained but the unit has sufficient torsional flexibility to allow for the use of a fixed rear hinge construction.

It will be appreciated that further modifications of this invention may be practiced without departing from the essential scope thereof. For example while four beams are shown positioned paralleled to each other, the number of beams may be varied as is their spacing depending on the size and use of the leveler.

Having described my invention, I claim:

1. A dock leveler comprising:
   a platform
   hinge means coupling said platform to a stationary member,
   means to move said platform from one position to another position, and
   a series of spaced split box beams mounted to said platform to provide support for said platform with torsional flexibility,
   wherein each of said split box beams comprise a pair of elongated angle sections held in place by web plates positioned between said angle sections, and
   said angle sections separated to have a split extending the length of each said split box beam.

2. The dock leveler of claim 1, wherein each of said split box beams comprise a pair of elongated L-shaped angle sections.

3. The dock leveler of claim 2, wherein each of said webs extends perpendicular to said L-shaped angle sections and is welded to each section at a position removed from ends of a respective split box beam.

4. The dock leveler of claim 1, wherein said split box beams are positioned on said platform parallel to each other.

5. The dock leveler of claim 1, wherein said split box beams are positioned on said platform parallel to each other and uniformly spaced apart.

6. The dock leveler of claim 1, wherein said hinge means comprises a rigid hinge.

7. The dock leveler of claim 1, wherein said means to move said platform comprises a hydraulic cylinder.

8. The dock leveler of claim 1, wherein said means to move said platform comprises spring means.

9. The dock leveler of claim 1 further comprising a lip mounted on one end of said platform and means to extend said lip when said leveler is lowered into an operative position.

* * * * *